United States Patent  [11] 3,623,797

| [72] | Inventor | Harold Albert Daw<br>2030 Guthrie Place, Las Cruces, N. Mex. 88001 |
| [21] | Appl. No. | 9,308 |
| [22] | Filed | Feb. 6, 1970 |
| [45] | Patented | Nov. 30, 1971 |

[54] INTERNALLY REFLECTING BARRIER CONTROL FILTERING APPARATUS
6 Claims, 2 Drawing Figs.

[52] U.S. Cl. ................................................. 350/311,
350/172, 350/286, 350/312
[51] Int. Cl. ........................................................ G02b 5/24
[50] Field of Search ................................................ 350/311,
312, 286, 172

[56] References Cited
UNITED STATES PATENTS
3,062,103  11/1962  Bolz ............................. 350/311 X
3,473,865  10/1969  Crosswhite ................... 350/286 X

OTHER REFERENCES

Holmes, " Separation of Close Spectral Lines by the Method of Anomalous Dispersion," Vol. 26, JOSA, No. 10, Oct. 1936, pp. 365– 366 copy in 350/311

Pfund, " Anomalous Dispersion by Diffraction," Vol. 24, No. 5 JOSA., 121– 124 (1934) 350/311

Pfund, " Anomalous Dispersion Within Absorption Bands," Vol. 25 JOSA 200 (1935) 350/311

Prokofjew et al., " Anomalous Dispersion in Thallium Vapor," Vol. 18 JOSA 57 (1929) 350/311

Sharpless et al., " Anomalous Dispersion in the Infrared," Vol. 52 JOSA 579 (1962) copy in 350/311

*Primary Examiner*— David Schonberg
*Assistant Examiner*— Toby H. Kusmer
*Attorneys*— R. S. Sciascia and Paul N. Critchlow ABSTRACT: Filtering apparatus is provided for isolating a very narrow optical frequency range in the order of a spectral line width. Features include a fixed geometry of a light input member relative to a barrier member as well as an appropriate selection of the media of these two members. The media of the input member can be any material that is more refractive than the barrier member and it has a flush interface with the barrier member disposed at such an angle that the interface angle of incidence is greater than the critical angle of the two members. Thus, all light wavelengths other than the wavelengths of particular concern, are internally reflected in the input member. To permit the desired optical frequency bank to pass, the barrier member is formed of a media having a capacity for absorbing input light in the immediate vicinity of a wavelength that falls within the narrow frequency pass band. The absorption produces an irregularity in the refractive dispersion curve for the barrier media. When the angle of incidence and the interface of the input and in barrier members is fixed sufficiently close to the critical angle for this interface, the irregularity varies the relative refractive index sufficiently to vary the relationship of the critical angle with the angle of incidence and permit the narrow band to pass into the barrier member and on into the output member.

PATENTED NOV30 1971  3,623,797

INVENTOR
HAROLD A. DAW
BY
ATTORNEY

INTERNALLY REFLECTING BARRIER CONTROL FILTERING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to filtering apparatus and, in particular, to filters capable of isolating narrow optical frequency ranges in the order of a spectral line width.

The prior art includes a number of techniques or methods for obtaining narrow band filtering. For example, the techniques have used dye filters, polarization filters, selective reflection as well as using monocromators, interference filters and scattering filters. All of these may have advantages in particular applications and it is not intended that they be replaced by the present filter. However, for many research efforts it is most desirable to isolate a narrow optical frequency range in the order of a spectral line width. The prior art for the most part achieves ranges in the order of 100 A.

It is therefore an object of the present invention to provide filtering apparatus capable of isolating an unusually narrow optical frequency range from a heterochromatic source.

Another object is to provide a filtering or isolating means that adapts to other processing techniques such as broadening, shield splitting and pumping to change populations.

A further object is to provide a filtering apparatus capable of isolating the narrow optical frequency range from a light source ranging from infrared to ultraviolet.

A more general object is to provide a relatively simple, inexpensive and stable instrument capable of fulfilling the end results of the foregoing objects.

DETAILED DESCRIPTION OF THE INVENTION

Figure 1:
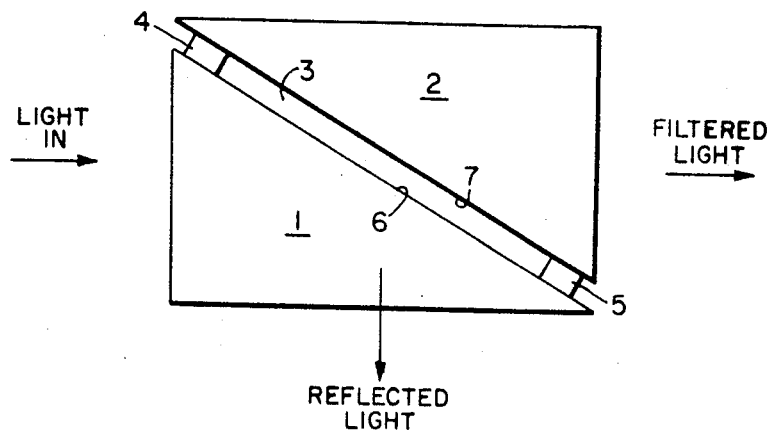
Figure 2:
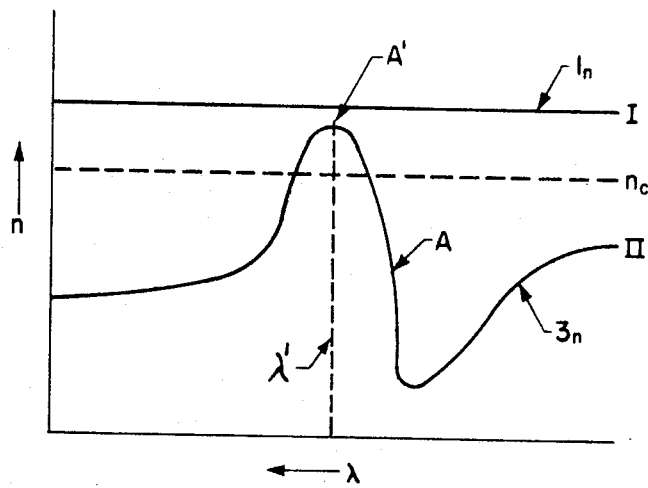

The invention as illustrated in the accompanying drawings of which:

FIG. 1 is a schematic illustration of the basic compounds employed in the present filtering apparatus, and FIG. 2 is a plot showing the manner in which refraction varies with wavelength in a media having an absorption line.

Referring to FIG. 1, the apparatus includes an input member 1, an output member 2 and a barrier member 3, input and output members being held in a definite geometric configuration by spacers 4 and 5.

The terms 'input' and 'output' simply connote that member 1 receives the light to be filtered while member 2 transmits the fraction of the light passed by the filter for further processing. Generally considered an arrangement of this type is capable of filtering input light of a very wide range of wavelengths, although for certain operations it may be desirable to utilize other filtering apparatus in advance of the present apparatus so that the beam of light received by member 1 lies within fixed frequencies. In this regard, it should be noted that the present techniques are not particularly concerned with specific structural configurations, but rather the concern is more broadly with a general embodiment of a principle that permits the filtering or an isolation of the unusually narrow optical frequency range. For example, the particular materials or media which form members 1, 2 and 3 are of concern only to the extent that these media exhibit certain physical properties to be described. Thus, as already stated, the media of member 1 must be more refractive than the media of member 3, while member 3 must be of a type having an absorption wavelength line or, in other words, being capable of absorbing light in the immediate vicinity of a particular wavelength. Any materials conforming to these physical requirements should permit the accomplishment of the present purposes although such considerations as the provision of flush contact of the interfaced members impose some restrictions in the choice.

A principal feature of the present invention resides in the geometrical relationship of the members and, in particular, the geometrical configuration of member 1 with regard to member 3. As may be noted in FIG. 1, input member 1 has an interface or boundary 6 with barrier member 3 and this interface is intentionally disposed at a particular inclination or angle that is highly critical in the operation of the present filter. In particular, the inclination of interface or boundary 6 must be at such an angle that the angle of incidence of the input light beam on the interface is greater than the so-called critical angle of the interface. When this situation exists, and when, as already stated, the materials of members 1 and 3 are selected to provide a relationship in which media of member 1 is more refractive than media of member 3, all light wavelengths, with the notable exception to be described, are internally reflected in the input member and escape from the member in the manner indicated in the drawing. It, of course, will be recognized that these requirements are well-known criteria for producing total internal reflection. It also might be pointed out at this point that, although member 3 has been termed a 'barrier' member, input member 1 also is literally a barrier member since it is the member that totally reflects and discards all unwanted wavelengths.

The penetration of light through the barrier provided by members 1 and 3 is critically dependent upon the difference between the refractive indices of the two media forming interface 6. The interface includes barrier member 3 and a fundamental requirement of the present invention is that the material or media of member 3, whether it be a gas, liquid or solid, must have an absorption line that causes the refractive index of the material of member 3 to vary in the manner illustrated in FIG. 2. As is known, the term absorption line means that the material has the capacity of absorbing light at a particular spectral line or wavelength. There are a number of materials possessing this characteristic or materials, solids or gases, can be doped in known manners to provide it. Also, this principle of selective absorption at an absorption line wavelength is a well-recognized phenomena.

FIG. 2 is a plot which shows the manner in which the refractive index of a material having the selective absorption characteristic varies with wavelength. By way of example the plot of FIG. 2 can be considered as a plot for a material such as sodium gas and it demonstrates the manner in which refractive index varies with wavelength. Ordinarily, the refraction decreases with increasing wavelength so that most materials demonstrate a rather smooth or proportionate curve in which there is a rather constant defined variation of the refraction with wavelength. However, when the material has an absorption line, the normally smooth dispersion curve has a pronounced irregularity such as the irregularity in FIG. 2 in the region of the curve marked with the letter A. In particular, it will be noted that, as the wavelength decreases, the index of refraction first increases to a certain extent and then increases abruptly to a point marked A' on the plot. The plot also includes two other lines, the first being a solid line marked $1_n$ which is the dispersion curve for the media of member 1. The second curve is marked $n_c$ and this curve is the critical index for the boundary or interface of members 1 and 3. Line $3_n$ then can be considered as the line representing the refractive index of the medium of barrier member 3. As shown in FIG. 2, using a suitable choice of materials and angles, the refractive index $3_n$ can be made to match at or in the immediate vicinity of wavelength $\lambda'$ which is the wavelength of interest for the filtering apparatus or, in other words, the narrow band of wavelengths which the apparatus is designed to pass. At all other frequencies, the filtering apparatus is internally reflective at or below critical index $n_c$. Normally, the materials or media of members 1 and 2 can be the same and, further the angle or inclination of interface 7 which is the boundary of members 2 and 3, can be parallel to the inclination of interface 6.

It is appreciated that the absorption line of the media of member 3 will cause some energy to be taken out of the beam.

However, calculations show that use of a thin barrier member 3 results in a small absorption so that a major portion of the energy can be transmitted. For example, the following values were obtained for percent transmittance using a gas of fairly low pressure as the media for member 3. In the calculations, the index of the materials of members 1 and 3 was set at 1.03 and the critical angle set for an index in the barrier of 1.02 (sin $v_c$=0.9804). Also, in the calculations, the barrier space was 4 wavelengths. As stated, the following values can be obtained under these conditions:

| w-w | %T |
| --- | --- |
| $-15\times10''$ | 0.017 |
| $-12.5\times10''$ | 0.038 |
| $-10\times10''$ | 0.089 |
| $-2\times10''$ | 0.224 |

Employing the principles of total reflection and selective absorption which have been defined above and utilizing the geometric relationships for the boundaries or interfaces, a filtering apparatus can be provided capable of passing a very narrow optical frequency band of an input light beam received from a heterochromatic source. For example, considering an absorption line having an angular frequency of $7.4\times10^{-15}$ per second, it can be calculated that such a line has a relationship $\Delta\lambda/\lambda$ of about $10^{-4}$. This calculation is made for a half maximum value of $\Delta\lambda$ so that it represents an average rather than a peak figure. Since the wavelength of such a line is about 5,000 A., $\Delta\lambda$ is in the order of 0.5 A. Thus it will be seen that the present filtering apparatus is capable of passing an unusually narrow frequency band of less than an angstrom which, in comparison with such prior art filtering apparatus as presently known, is unique to the extent that it reduces the width of the pass by a factor of a hundred or more.

The ability to isolate a frequency band of about 1 A. should be found valuable in a number of research applications. Also, as will be appreciated, the present filtering apparatus lends itself to other desirable uses such for instance as the fact that modulation techniques can be applied to the absorption line. The materials can be anything from IR to UV transmitting and it also is considered that the present principles would apply in the microwave area although they would not be as useful in this area. Most suitably, the material for barrier member 3 is a fluid material which preferably would be a gas although a liquid or plastic also would be appropriate. Solids for the barrier member might present some difficulty since it is absolutely essential that the interfaces of the members be absolutely flush one with the other to provide a true relative refractive index for the entire interface so that the apparatus is controlled solely by the geometrical relationships that have been described.

Obviously many modifications and variations of the present invention are possible in the light of the above teachings. It is therefore to be understood that within the scope of the appended claims the invention may be practiced otherwise than as specifically described.

I claim:

1. Filtering apparatus for passing a narrow optical frequency band of input light received from a heterochromatic light beam source comprising:

spaced light-transmissive input and output members, and a barrier member disposed between and in flush interface contact with said input and output members, said input member being formed of a more refractive media than said barrier member and the input member having its interface with said barrier member disposed at such an angle that the interface angle of incidence is greater than the critical angle of said interface whereby all light wavelengths of said source other than those included in said narrow band are internally reflected in said input member, said barrier member media being characterized by having the capacity to absorb light in the immediate vicinity of a wavelength within said narrow optical frequency band and said absorption producing an irregularity in the refractive dispersion curve for the barrier media, said angle of incidence at the interface of the input and barrier member being fixed sufficiently close to said critical angle that said irregularity resulting from said absorption varies the relationship of the critical angle with the angle of incidence sufficiently to permit said narrow band to pass from the input member into the barrier member, said barrier member being sized to pass a portion of said narrow band to said output member.

2. The filtering apparatus of claim 1 wherein said barrier member media is a fluid.

3. The filtering apparatus of claim 2 wherein said barrier member media is a gas.

4. The filtering apparatus of claim 1 wherein said input and output members are formed of the same media.

5. The filtering apparatus of claim 4 wherein the interface angle of the output and barrier members parallel the interface angle of the input and barrier members.

6. The filtering apparatus of claim 5 wherein the narrow optical frequency band is in the order of a spectral line width.

* * * * *